United States Patent [19]
Provensal

[11] 4,322,097
[45] Mar. 30, 1982

[54] EMERGENCY RELEASE DEVICE OF A SAFETY BELT

[75] Inventor: Jacques Provensal, Maurepas, France

[73] Assignee: Regie Nationale des Usines Renault, Boulogne-Billancourt, France

[21] Appl. No.: 120,128

[22] Filed: Feb. 11, 1980

[30] Foreign Application Priority Data

Feb. 9, 1979 [FR] France ............................. 79 03327

[51] Int. Cl.³ .............................................. B60R 21/10
[52] U.S. Cl. .................................... 280/808; 280/803
[58] Field of Search ............... 280/808, 801, 802, 803, 280/804; 297/469, 483

[56] References Cited

U.S. PATENT DOCUMENTS 3,927,902 12/1975 Lindblad ............................. 280/804

FOREIGN PATENT DOCUMENTS 2324896 12/1974 Fed. Rep. of Germany .
2460340  6/1976 Fed. Rep. of Germany .
2520111 11/1976 Fed. Rep. of Germany .
2724402 12/1978 Fed. Rep. of Germany ...... 280/808
2348716 11/1977 France .

Primary Examiner—Robert R. Song
Attorney, Agent, or Firm—Oblon, Fisher, Spivak, McClelland & Maier

[57] ABSTRACT

An emergency release device of a safety belt anchoring which is anchored to a frame element of a vehicle body, and which is located in the vehicle passenger space includes a control device permitting an instantaneous release of the anchoring and of the respective safety belt and features the combination of an anchoring bracket, a screw, an elastic ejection device, a removable bolt, a control lever and a retaining nut.

11 Claims, 8 Drawing Figures

EMERGENCY RELEASE DEVICE OF A SAFETY BELT

BACKGROUND OF THE INVENTION

1. Field of the Invention

This invention relates to an emergency release device of a safety belt.

2. Description of the Prior Art

The principle of retaining the passenger of a vehicle in case of a front end collision with the help of a diagonal belt or shoulder belt and a stop placed under the side board and forming a catch for the knees is well known and will not be described in detail here. Such a system can easily be made passive (i.e. the retaining device is put into place automatically on the passenger without any action on his part) by hooking the outside point of anchoring of the shoulder belt on the frame of the door. Thus, the shoulder belt is released by itself with the opening of the door, permitting the passenger to get out, and places itself on the passenger when the door is closed after the passenger enters the vehicle.

There exist different possibilities of mounting the shoulder belt which is passive. However, the upper outside anchoring on the door always exists and can either serve the purpose of directly fastening the shoulder belt ending in a metal clamp in case the retracting device of the belt is placed at the center of the vehicle between the seats or serve the purpose of fastening a return belt in case the retracting device is placed in the door in accordance with a known arrangement.

SUMMARY OF THE INVENTION

The invention has as its principal object, permitting the release of a passenger with a belt fastened on him after a collision by a person intervening from outside the vehicle.

Quite obviously, another buckle for emergency unbuckling can be arranged inside the vehicle for operation by the passenger, for example, in the center of the vehicle under the seats in accordance with a well known arrangement.

The invention more particularly concerns an emergency release device of a safety belt anchoring, said anchoring being part of an element of the body of a vehicle and located in its passenger space, and being of the type comprising a control device permitting an instantaneous release of said anchoring and of the respective safety belt, and is characterized by the combination on an anchoring bracket of a unit of parts including a screw, an elastic ejection means, a removable bolt and its control lever as well as retaining nut.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
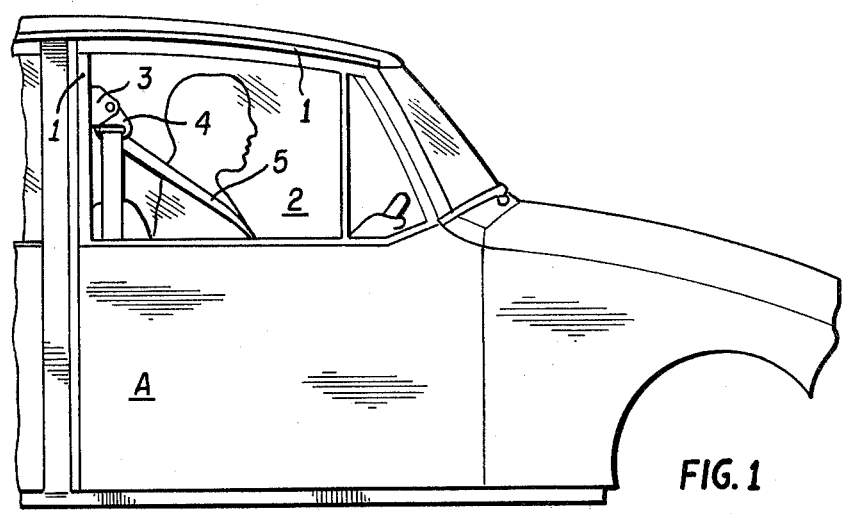
FIG. 1 is a partial view in elevation of a vehicle equipped with an anchoring bracket and a safety belt.

In the drawings, wherein like reference numerals indicate like parts throughout the several views, a partial elevational view of a vehicle with a door A, with a window frame or an upper door frame 1, a window 2 and an anchoring bracket 3 fixed on the door frame 1 by known means, such as welding, for example, is seen in FIG. 1. A return 4 of the strap 5 of the belt is also seen when the retracting device is located in the door. However, the invention is also applicable in case the retracting device is located in the vehicle, whereupon the return of the strap is then replaced by a metal clamp retaining the extreme end of said strap.

Figure 2:
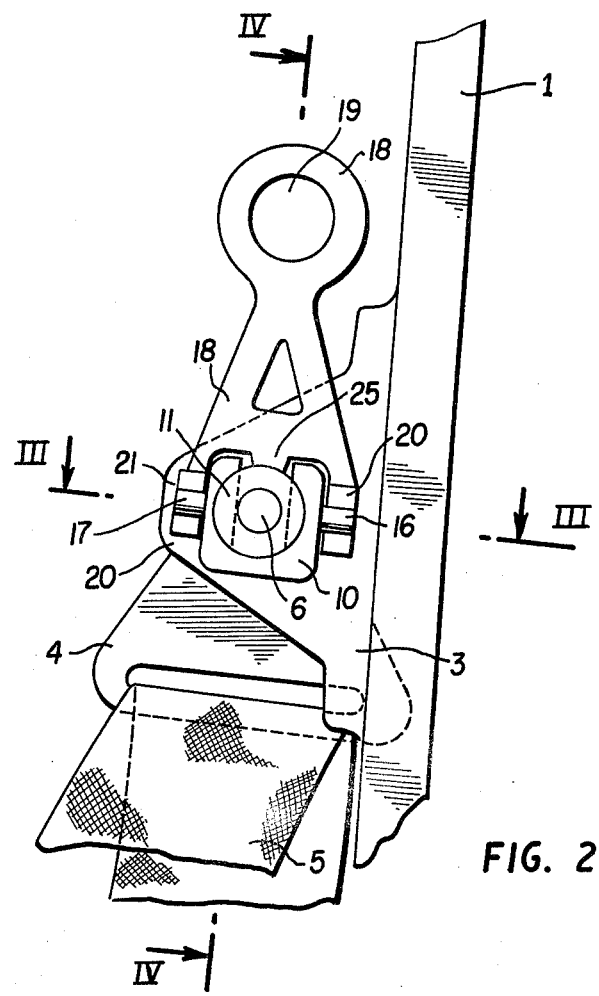
FIG. 2 is a front view on the anchoring device according to the invention, seen from the outside of the vehicle.
Figure 3:
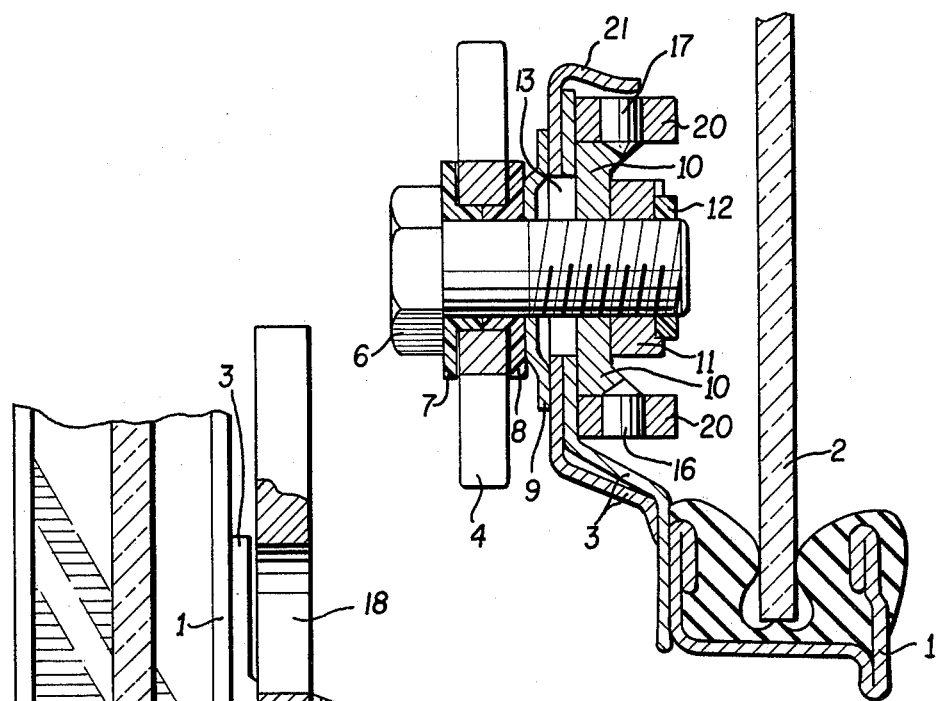
FIG. 3 is an enlarged cross-sectional representation along the line III—III of FIG. 2.
Figure 4:
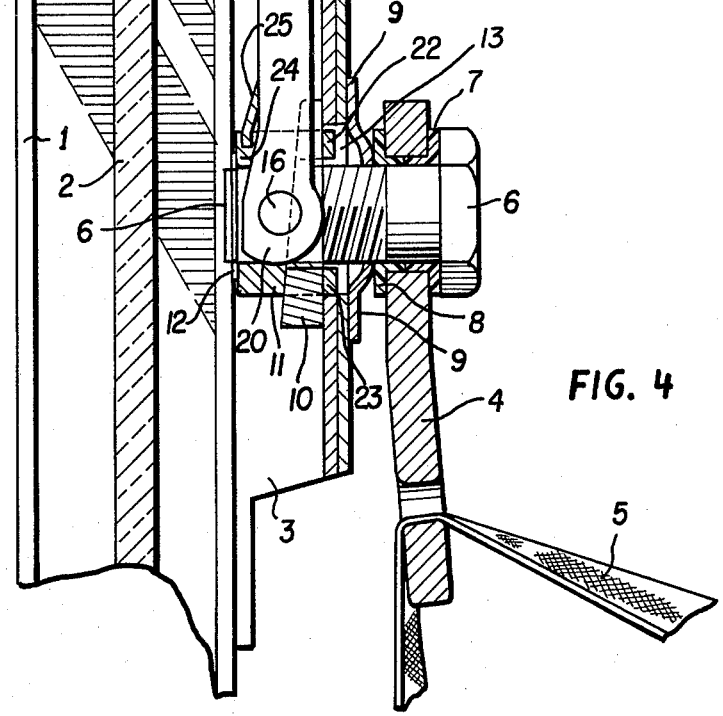
FIG. 4 is an enlarged cross-sectional representation along the line IV—IV of FIG. 2.
Figure 5:
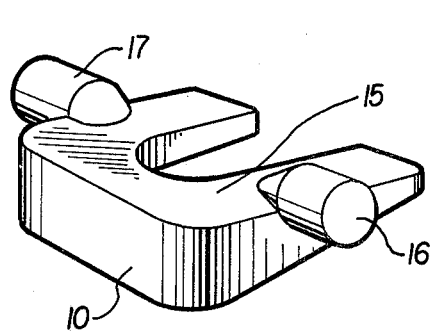
FIG. 5 is a perspective view of a fork forming part of the anchoring device.
Figure 6:
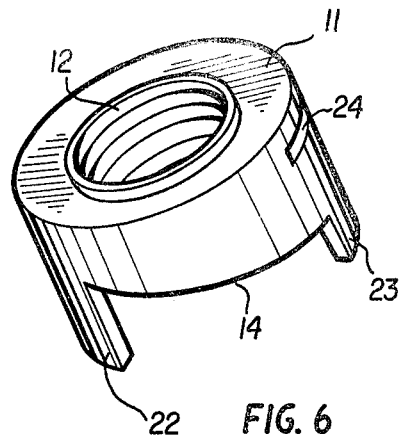
FIG. 6 is a perspective view of a nut forming part of the anchoring device.

With reference to FIGS. 2, 3 and 4, the return 4 of the strap 5 is fixed on the anchoring bracket 3 with the help of a screw 6 which successively passes through the following elements: a cover of plastic material preferably in two parts 7 and 8, a disk 9 made in such a way that it can be deformed under the effect of an axial load, the anchoring bracket 3 provided with a small raised edge 21 which is clearly visible in FIG. 3, an open fork 10 and, finally, a nut 11 with screw retention 12 of a standard plastic disk type set in the nut. The anchoring bracket 3 is provided with a hole 13 having a diameter slightly greater than that of the nut 11 while being less than the width of the fork 10. The nut 11, shown in a general perspective in FIG. 6, has, additionally, an inclined surface 14 at its lower part, being in contact with the fork 10, and in agreement with the inclined surface 15 of the fork 10, also shown in a general perspective in FIG. 5. The nut 11 has, furthermore, two projections 22 and 23 at one end of its cylindrical shape and a groove 24 at the opposite end. The fork 10 has two spindles 16 and 17 placed in a transverse direction in relation to the axis of the opening of said fork.

A lever 18 which is clearly visible in FIGS. 2 and 4 is linked to the spindles 16 and 17 of the fork 10. When the device is installed, the lever 18 is in a practically vertical plane. At the end distal from the linking to fork 10, the lever 18 has a hole 19 at its upper part which is of such a size that it is possible to effect the operation described below with the help of one or several fingers.

Finally, the lever 18 has a lamella forming a tongue or spring 25 which is introduced into the groove 24 of the nut 11 with a slight effort when the device is in normal position.

The device according to the invention is assembled as follows: the nut 11 is placed on the fork 10 in such a manner that the inclined planes 14 and 15 are in agreement with each other and that the projections 22 and 23 of the nut 11 penetrate the fork 10 as can be seen in FIG. 4. Any turning of the nut 11 in relation to the fork 10 is thus made impossible owing to the blockage created by the projections 22 and 23. The lever 18, previously installed on the spindles 16 and 17 of the fork, is reclosed on the fork in the position shown in FIG. 2 until tongue 25 catches in the groove of the nut 24. The unit consisting of the elements 10, 11, 18 is thus assembled and placed into the hole 13 of the anchoring bracket 3 in such a manner that the lever 18 is practically vertical. The projections 22 and 23 are made of a sufficient length in order to be able to aid in guiding the nut 11 into the hole 13 of the anchoring bracket 3. In this way, a correct assembly as well as satisfactory alignment is achieved of the different elements composing the device. It will also be noticed that one of the sides of the assembled unit 10, 11, 18 rests with its part 17 and 20 against the small raised edge 21 of the anchoring bracket 3 which prevents a turning of the assembled unit 10, 11, 18 and permits the screwing of the screw 6 into the nut 11. The screw 6, over which one has previously slipped the return 4 provided with its cover 7 and 8 and the deformable disk 9, is then screwed into the nut 11 until a connection, fixed at a given level, is obtained, avoiding the complete compression of the deformable disk 9. The tightening thus achieved is maintained owing to the retaining nut 12 preventing any inopportune loosening as well as the noise phenomena which might develop with the driving of the vehicle.

Figure 7:
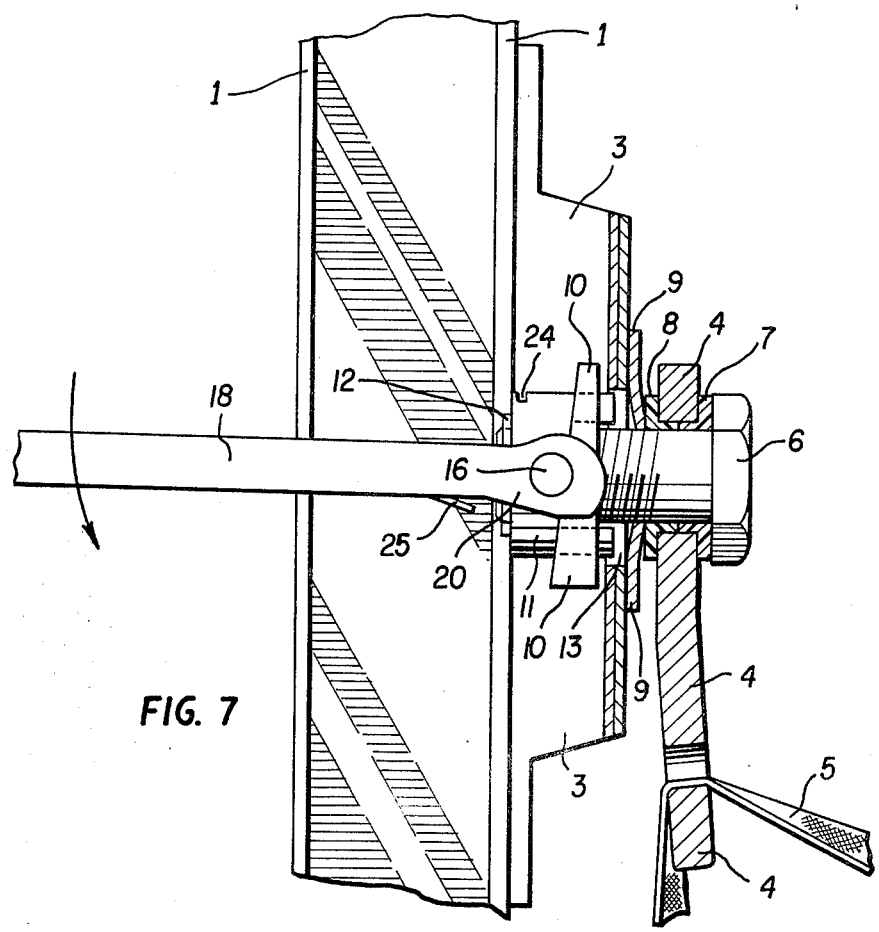
FIG. 7 is a partial cross-sectional representation along the line IV—IV of FIG. 2, with the intervening lever pivoted by 90°.
Figure 8:
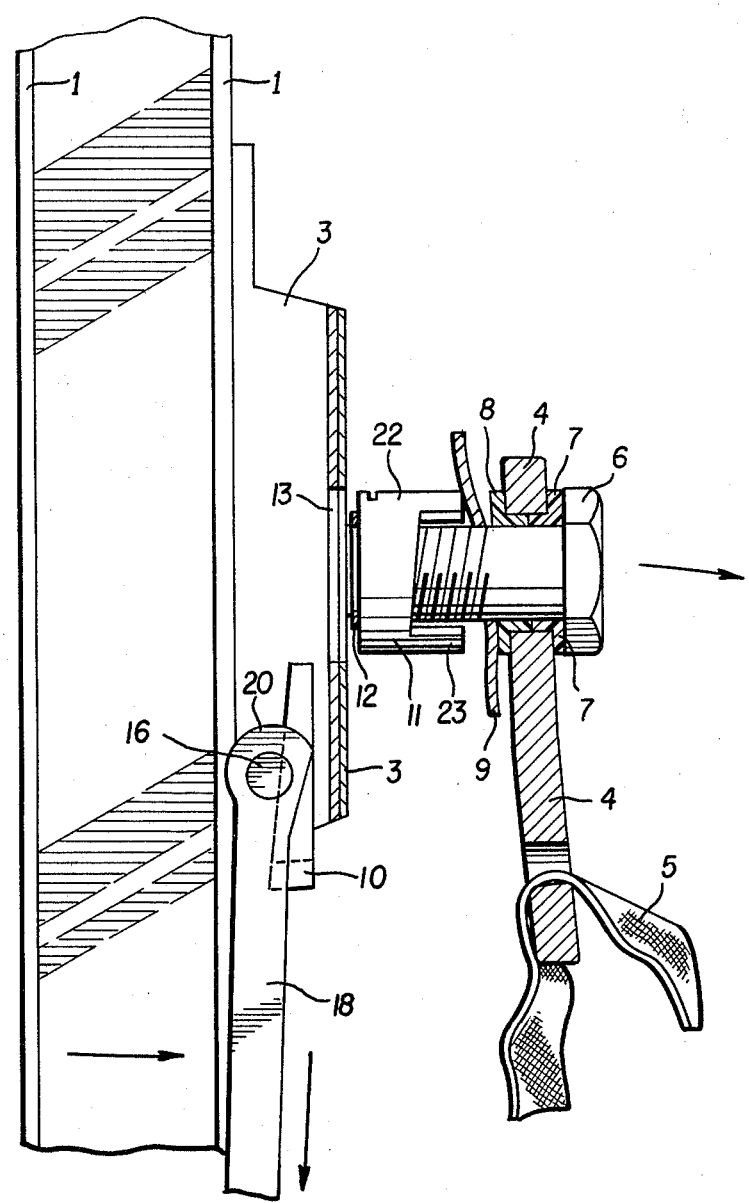
FIG. 8 is a partial cross-sectional representation along the line IV—IV of FIG. 2, with the intervening lever pivoted by 180°.

The device according to the invention operates as follows: after a collision, in case somebody outside the vehicle wants to release the person riding in the vehicle from his belt, the following operations which are shown in FIGS. 7 and 8 are effected. After breaking the side window 2, which might already have been broken by the impact, the intervening person swings the lever 18 downward by eliminating the safety tongue 25 in the groove 24 made in the nut 11. In the course of the downward turning movement, the eccentrics 20 come into contact with the surface of the anchoring bracket 3 and have thus the tendency to pull the unit, consisting of the fork 10, nut 11 and screw 6, towards the outside of the vehicle by deforming the disk 9 arranged for this purpose. The tightness of the sub-assembly consisting of the return 4, disk 9, anchoring bracket 3, fork 10 and nut 11 is, therefore, reduced in sizable proportions owing to the reduction in the thickness of the disk 9. The downward movement of the lever 18 is continued (FIG. 8) until an alignment is obtained along a practically vertical straight line of the unit lever 18 and fork 10. A downward movement of the unit lever 18 and fork 10 is sufficient to free the fork 10 from the nut 11 and this can be done particularly easily because a wedge shape has been given to the two surfaces of the nut 11 and fork 10 in contact with each other. It is pointed out that any other self-releasing shape of the nut 11 and of the fork 10 can be used as well and is, as such, not outside the framework of the invention. Moreover, the reduction of the tightness through the eccentric effect described above considerably facilitates this operation.

When the fork 10 has been released in a downward movement, the nut 11, guided into the hole 13 of the anchoring bracket 3 by its projections 22 and 23, passes across the hole, releasing the return 4 and loosening the strap 5.

The anchoring bracket 3 could also be formed by an extension formed from the lateral upright of the roof.

When the device according to the invention is installed on the door frame, there exists a retaining device of the unit with the lateral upright of the roof which opposes any traction effort on the safety belt (a form of the invention which has not been shown).

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An emergency release device of a safety belt anchoring bracket which is anchored to a frame element in the passenger space of a vehicle for instantaneous release of the anchoring bracket and of the safety belt, comprising;

an anchoring bracket fixed to the frame element;
a safety belt return retaining the safety belt;
a bolt and nut comprising a disengageable bolt and nut assembly, said assembly securing the return to the bracket;
a releasable open fork element straddling the bolt between the nut and the bracket;
an elastic releasing means retained between the bracket and the return by the bolt;
and
a control lever connected to the releasable open fork for releasing said fork and said nut and bolt assembly from the bracket when the lever is rotated.

2. An emergency release device as in claim 1, wherein: the anchoring bracket has a hole therein of larger diameter than the nut, and through which the nut passes when disengaged.

3. An emergency release device according to claim 2, wherein the diameter of the hole in the anchoring bracket is smaller than the thickness of the releasable open fork.

4. An emergency release device according to claim 3, wherein the anchoring bracket has at least one raised edge placed in such a way as to prevent any rotating movement of the nut during assembly abd during normal operation of the device.

5. An emergency release device according to claim 1, wherein both the nut and the releasable open fork have a complementary self releasing form.

6. An emergency release device according to claim 5, wherein the nut is equipped with two lugs or projections for guiding the nut into the hole of the anchoring bracket and for blocking the turning of said nut in relation to said releasable open fork.

7. An emergency release device according to claim 1, wherein said elastic releasing means is a deformable disk which can reduce its thickness under the effect of an axial load.

8. An emergency release device according to claim 1, wherein said control lever facilitates the extraction of said releasable open fork which is in the form of a wedge.

9. An emergency release device according to claim 8, wherein said control lever is equipped with a tongue-like safety spring engaged in a groove of the nut while said lever is at rest.

10. An emergency release device according to claim 8, wherein said lever has an eccentric shape near the articulation point of said lever with said open fork, for reducing the securing of the bolt and nut assembly with the bracket when said lever is rotated.

11. An emergency release device according to claim 1 or 2 or 3 or 4 or 5 or 6 or 7 or 8 or 9 or 10 wherein said anchoring bracket is placed on the upper part of the frame of the door.

* * * * *